US008774034B2

(12) United States Patent
Li et al.

(10) Patent No.: US 8,774,034 B2
(45) Date of Patent: Jul. 8, 2014

(54) METHOD AND APPARATUS FOR FREQUENCY OFFSET ESTIMATION AND CORRECTION IN ORTHOGONAL FREQUENCY DIVISION MULTIPLEXING SYSTEM

(75) Inventors: Ping Li, Guangdong Province (CN); Zhaohua Zeng, Guangdong Province (CN); Hongfeng Qin, Guangdong Province (CN); Weiju Sun, Guangdong Province (CN); Lujia Han, Guangdong Province (CN); Jie Lei, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 385 days.

(21) Appl. No.: 13/258,004

(22) PCT Filed: Jun. 4, 2010

(86) PCT No.: PCT/CN2010/073588
§ 371 (c)(1),
(2), (4) Date: Dec. 27, 2011

(87) PCT Pub. No.: WO2010/145466
PCT Pub. Date: Dec. 23, 2010

(65) Prior Publication Data
US 2012/0087263 A1    Apr. 12, 2012

(30) Foreign Application Priority Data

Jun. 30, 2009 (CN) .......................... 2009 1 0159802

(51) Int. Cl.
*H04W 24/00* (2009.01)
(52) U.S. Cl.
USPC ....................................................... 370/252

(58) Field of Classification Search
CPC .................................................... H04W 24/00
See application file for complete search history.

(56) References Cited

U.S. PATENT DOCUMENTS

| 2005/0226341 | A1* | 10/2005 | Sun et al. ...................... 375/260 |
| 2008/0069252 | A1* | 3/2008 | Wenzhen et al. ............. 375/260 |
| 2008/0273641 | A1 | 11/2008 | Yang et al. |

FOREIGN PATENT DOCUMENTS

| CN | 1595829 A | 3/2005 |
| CN | 1671064 A | 9/2005 |

(Continued)

OTHER PUBLICATIONS

International Search Report for PCT/CN2010/073588 dated Aug. 17, 2010.

*Primary Examiner* — Sulaiman Nooristany
(74) *Attorney, Agent, or Firm* — Ling Wu; Stephen Yang; Ling and Yang Intellectual Property LLC

(57) ABSTRACT

A frequency offset estimation and correction method in an orthogonal frequency division multiplexing (OFDM) system is disclosed in present invention, including: obtaining a pilot frequency domain channel estimation value of a target user, and smoothing the channel estimation value in frequency domain; obtaining the link quality state of a receiver; adopting a history smoothing algorithm or a multi-branch attempt algorithm to perform frequency offset estimation and frequency offset compensation, performing frequency domain demodulation for the data for which frequency offset compensation has been performed, and outputting a link quality state parameter; and updating the link quality state of the receiver according to the link quality state parameter, determining the output value of this frequency offset estimation and outputting a history frequency offset value required by next frequency offset estimation according to the determined output value of this frequency offset estimation. A corresponding apparatus is also disclosed in the present invention.

15 Claims, 3 Drawing Sheets

(56) References Cited

FOREIGN PATENT DOCUMENTS

| | | | |
|---|---|---|---|
| CN | 101184075 A | 5/2008 | |
| JP | 2000188580 A | 7/2000 | |
| JP | 2000244440 A | 9/2000 | |
| JP | 2008011271 A | 1/2008 | |
| JP | 2008263426 A | 10/2008 | |
| JP | 2009182837 A | 8/2009 | |
| JP | 2012511269 A | 5/2012 | |

* cited by examiner

METHOD AND APPARATUS FOR FREQUENCY OFFSET ESTIMATION AND CORRECTION IN ORTHOGONAL FREQUENCY DIVISION MULTIPLEXING SYSTEM

TECHNICAL FIELD

The present invention relates to a field of mobile communication, and in particular, to a method and an apparatus for estimating and correcting a frequency offset of an orthogonal frequency division multiplexing system in the mobile communication field.

BACKGROUND OF THE RELATED ART

The long term evolution (LTE) project is the greatest new technology research and development project initiated by the 3 GPP in the recent two years, which improves and enhances the air access technology of the 3G. Compared with the 3G, the LTE has more technical advantage, which manifested in the aspects such as a much higher user data rate, grouping transmission, system delay decrease, an improvement of system capacity and coverage, and reducing of the operating cost, etc.

The LTE downlink uses the orthogonal frequency division multiplexing (OFDM) technology. The OFDM has the characteristics such as high usage of frequency spectrum, anti-multipath interference, etc. and the OFDM system can effectively resist the influence produced by the wireless channel. The LTE uplink transmission scheme uses a single carrier frequency division multiple access (SC-FDMA) with a cyclic prefix. In the transmission scheme in which the uplink uses the SC-FDMA with the cyclic prefix, a frequency domain signal is obtained by using a discrete fourier-transform (DFT), then a frequency spectrum shifting is performed after inserting a zero symbol, and an inverse fast fourier transform (IFFT) is performed on the shifted symbol, which can reduce the peak-to-average power ratio of the transmitting terminal. Therefore, the SC-FDMA system is also called as a discrete fourier-transform spread orthogonal frequency division multiplexing (DFT-S-OFDM) system.

For the multi-carrier system, the offset of the carrier frequency could cause generating the interference between the sub-channels. A plurality of orthogonal sub-carriers exist in the OFDM system, and the output signal is the overlap of a plurality of the sub-carrier signals. Due to that the sub-carriers overlap each other, this requires a higher demand for the othogonality of the carriers.

Due to the moving of a terminal, a Doppler frequency shift could be generated between a base station and the terminal. In the mobile communication system, especially in the high speed scenario, this kind of frequency shift is particularly obvious. The Doppler frequency shift will generate a frequency error between a receiver and a transmitter, which causes an offset occurring in the received signal in the frequency domain, introduces the interference between the carriers, thus increasing the error rate of system and worsening the performance.

The size of the Doppler frequency shift is related to the velocity of the relative motion, and the relationship between them is:

$$f_d = -\frac{f_0}{C} \times v \times \cos\theta$$

Wherein, $\theta$ is a separation angle between the terminal moving direction and the signal transmission direction; $v$ is the terminal moving velocity; $C$ is the electromagnetic wave propagation transmission velocity; and $f_0$ is the carrier frequency.

For the mobile terminal, the LTE system ensures to keep the system feature of the mobile user with a velocity of 15 km/h and below to be best, while provides a high performance service to the mobile user with a velocity of 15~120 km/h, keeps the service to the mobile user with a velocity of 120~350 km/h, and keeps the mobile user with a velocity above 350 km/h to be connected. In the scope of this velocity, the Doppler frequency shift is above 400 Hz. The base station and the terminal must support enough frequency offset compensation technology to satisfy the service quality requirement.

For the receiver, the function which the receiver must finish is to estimate the frequency error between the receiver and the transmitter and finish the frequency error correction. The frequency shift for the terminal receiving is $f_d$ and the uplink signals are sent after the terminal locks the downlink signal frequency, and the frequency shift for the uplink receiving is $2*f_d$.

As shown in FIG. 1, the relative motion directions of the terminal and the base station are different, which could generate positive and negative frequency offsets. Provided that $f_0$ is the transmission frequency of the base station, when the terminal moves to the direction away from the base station, it will generate a negative frequency offset $-f_d$, the frequency for the terminal to receive is $f_0-f_d$, while the frequency for the base station to receive is $f_0-2*f_d$; When the terminal moves to the direction towards to the base station, it will generate a positive frequency offset $f_d$, the frequency for the terminal to receive is $f_0+f_d$, while the frequency for the base station to receive is $f_0+2*f_d$. When the terminal moves between the two base stations from one base station to another base station, a frequency hopping, which is from the frequency $f_0-f_d$ to the frequency $f_0+f_d$, could occur in the terminal, and the terminal will have a frequency hopping $2*f_d$. The $2*f_d$ is not a small challenge not only for the base station receiver but also for the terminal receiver. The overlarge frequency offset could cause a communication quality reduction, and could cause the service interruption in severe cases, especially in the high speed mobile environment.

If the frequency offset cannot be estimated correctly and be corrected, then the system performance will reduce greatly. Especially it will be more obvious when the frequency offset is larger (the corresponding moving velocity of the terminal is higher). Therefore, it is very important to find a method and an apparatus for estimating and compensating the frequency offset with a good performance of correcting the frequency offset and a stable implementation for the engineering implementation.

SUMMARY OF THE INVENTION

The technical problem to be solved by the present invention requires is to provide a method and an apparatus for estimating and correcting a frequency offset in an orthogonal frequency division multiplexing system, which is used for estimating and correcting the frequency offset between a base station and a terminal in the orthogonal frequency division multiplexing system, especially for the problem that the mobile terminal in a high speed movement requires a quick and stable frequency offset estimation and correction.

In order to solve the above problems, the present invention provides a method for estimating and correcting a frequency offset in an orthogonal frequency division multiplexing system, comprising:

obtaining a pilot frequency domain channel estimation value of a target user and smoothing the channel estimation value in frequency domain;

obtaining a link quality state of a receiver:

adopting a history smoothing algorithm to perform frequency offset estimation and frequency offset compensation, performing a frequency domain demodulation for the data for which the frequency offset compensation has been performed and outputting one link quality state parameter, according to a history frequency offset value and the pilot frequency domain channel estimation value of the target user when the link quality state satisfies a startup threshold condition; and adopting a multi-branch attempt algorithm to perform the frequency offset estimation and frequency offset compensation, performing the frequency domain demodulation for the data for which the frequency offset compensation has been performed and selecting to output one link quality state parameter, according to the pilot frequency domain channel estimation value of the target user when the link quality state does not satisfy the startup threshold condition; and updating the link quality state of the receiver according to the link quality state parameter, determining the output value of this frequency offset estimation, and outputting a history frequency offset value required by a next frequency offset estimation according to the determined output value of this frequency offset estimation.

The step of obtaining the pilot frequency domain channel estimation value of the target user and smoothing the channel estimation value in frequency domain comprises:

obtaining channel estimation values corresponding to two pilots according to a local frequency domain pilot code and a frequency domain receiving sequence of the two pilots received by the target user; and performing sectioning for the channel estimation value corresponding to each pilot of the target user and performing frequency smoothing in each section.

The link quality state comprises following parameters:

a signal-noise ratio threshold, acting as a standard of whether the link quality corresponding to the data for which the frequency offset compensation and demodulation has been performed satisfies a requirement;

a link quality state register R, in which the state of the R is 0 or 1, wherein 1 represents the link state satisfies the requirement and 0 represents the link state does not satisfy the requirement;

a link quality count threshold, acting as a startup threshold condition of whether to start the history smoothing history to perform the frequency offset estimation and the frequency offset compensation, wherein, the history smoothing algorithm is stared if larger than the count threshold; and a link quality counter, used for calculating the number of 1s in the link quality state register, triggering to start the history smoothing algorithm to perform the frequency offset estimation and the frequency offset compensation when the count in the counter is greater than the link quality count threshold, and triggering to start the multi-branch attempt algorithm to perform the frequency offset estimation and the frequency offset compensation when the count in the counter is less than the link quality count threshold.

The step of adopting the history smoothing algorithm to perform frequency offset estimation and frequency offset compensation, performing a frequency domain demodulation for the data for which the frequency offset compensation has been performed and outputting one link quality state parameter, according to the history frequency offset value and the pilot frequency domain channel estimation value of the target user when the link quality state satisfies the startup threshold condition comprises:

performing the frequency offset compensation for antennas according to the calculated frequency offset estimation value of the target user as per a degree of antenna correlation;

performing the demodulation for the data for which the frequency offset compensation has been performed in the frequency domain and obtaining the demodulated data in frequency domain; and calculating the signal-noise ratio SIR or a check word (cyclical redundancy check, CRC) of the demodulated data, wherein the link quality state parameter is the signal-noise ratio SIR or the check word.

The step of performing the calculation for the frequency offset estimation value of the target user by using the history frequency offset value and the pilot frequency domain channel estimation value of the target user comprises:

first, calculating this remnant frequency offset $\Delta\Delta f_{ka}$ according to the pilot frequency domain channel estimation value of the target user $H_1^{(m)}(k)$ and $H_2^{(m)}(k)$ and the history frequency offset value $\overline{\Delta f}_{n-1}$:

$$\Delta\Delta f_{s,ka} = \frac{\angle(\overline{H}_{2,s,ka}^{(m)}) - \angle(\overline{H}_{1,s,ka}^{(m)}) - 2\pi \cdot L \cdot t \cdot \overline{\Delta f}_{n-1,ka}}{2\pi \cdot L \cdot t} + l \times 2000$$

$$= \frac{\angle(\overline{H}_{2,s,ka}^{(m)}) - \angle(\overline{H}_{1,s,ka}^{(m)})}{2\pi \cdot L \cdot t} - \overline{\Delta f}_{n-1,ka} + l \times 2000$$

$$\Delta\Delta f_{ka} = \frac{1}{Q}\sum_{s=1}^{Q}\Delta\Delta f_{s,ka},$$

wherein, $\overline{\Delta f}_{n-1,ka}$ is from last frequency offset estimation output, L is the number of orthogonal frequency division multiplexing signals between two pilots, t is time interval between the orthogonal frequency division multiplexing signals, n represents a sub-frame number, 1 is an integer which makes $\Delta\Delta f_{s,ka} \in (-1000,1000)$, a signal "$\angle$" represents calculating the phase, and Q represents the number of the sections;

then, determining that this compensation frequency offset is $\Delta f_{ka} = \overline{\Delta f}_{n-1,ka} + \Delta\Delta f_{ka}$.

The step of adopting the multi-branch attempt algorithm to perform the frequency offset estimation and frequency offset compensation, performing the frequency domain demodulation for the data for which the frequency offset compensation has been performed and selecting to output one link quality state parameter, according to the pilot frequency domain channel estimation value of the target user when the link quality state does not satisfy the startup threshold condition comprises:

calculating the frequency offset estimation value of the target user according to the pilot frequency domain channel estimation value of the target user and each compensation initial value;

performing the frequency offset compensation for the antennas according to the calculated frequency offset estimation value of the target user as per the degree of the antennas correlation;

performing the demodulation for each of the data for which the frequency offset compensation has been performed in frequency domain and obtaining each of the demodulated data in frequency domain;

calculating the signal-noise ratio SIR or a check word of each of the demodulated data, wherein the link quality state parameter is the signal-noise ratio SIR or the check word; and selecting a branch of demodulated data with a larger signal-noise ratio or a correct check word from each demodulated data, making the initial frequency offset value of the branch+ the remnant frequency offset value of the branch as an output estimation frequency offset and making the signal-noise ratio SIR of the branch as an output signal-noise ratio SIR.

The step of calculating the frequency offset estimation value of the target user according to the pilot frequency domain channel estimation value of the target user and each compensation initial value comprises:

first, calculating this remnant frequency offset $\Delta\Delta f_{ka}$ according to the pilot frequency domain channel estimation value of the target user $H_1^{(m)}(k)$ and $H_{2(m)}(k)$ and the initial frequency offset values of the various branches $f_g^{(m)}$:

$$\Delta\Delta f_{s,ka} = \frac{L(\overline{H}_{2,s,ka}^{(m)}) - L(\overline{H}_{1,s,ka}^{(m)}) - 2\pi \cdot L \cdot t \cdot f_g}{2\pi \cdot L \cdot t} + l \times 2000$$

$$= \frac{L(\overline{H}_{2,s,ka}^{(m)}) - L(\overline{H}_{1,s,ka}^{(m)})}{2\pi \cdot L \cdot t} - f_g + l \times 2000$$

$$\Delta\Delta f_{ka} = \frac{1}{Q}\sum_{s=1}^{Q} \Delta\Delta f_{s,ka},$$

wherein, L is the number of the orthogonal frequency division multiplexing signals between the two pilots, l is the integer which makes $\Delta\Delta f_{s,ka} \in (-1000, 1000)$, t is the time interval therebetween, the signal "∠" represents calculating the phase, Q represents the number of the sections, g=1, ..., Z, wherein Z is the number of the branches;

then, determining that this compensation frequency offset $\Delta f_{ka,g}$ is $\Delta f_{ka,g} = f_g + f\Delta_{ka}^l$.

The step of updating the link quality state of the receiver according to the link quality state parameter and determining the output value of this frequency offset estimation comprises:

the link quality state parameter is the signal-noise ratio SIR, determining the output of this frequency offset estimation is the history frequency offset value+the remnant frequency offset value, meanwhile updating the latest state position as 1 in the link quality register R and updating the count value of the link quality counter if the signal-noise ratio is greater than the signal-noise ratio threshold;

determining the output of this frequency offset estimation is the history frequency offset value, meanwhile updating the latest state position as 0 in the link quality register R if the signal-noise ratio is less than the signal-noise ratio threshold; and determining the history frequency offset value required by the next frequency offset estimation as:

the next history frequency offset value=(1−p)*this frequency offset history value+p*this frequency offset estimation, that is, $\overline{\Delta f_{n,ka}} = (1-p) \times \overline{f\Delta_{n-1,ka}} + p \times f\Delta_{ka}$ wherein, p is a decimal between 0 and 1.

The step of performing the frequency offset compensation for the antennas according to the calculated frequency offset estimation value of the target user as per the degree of the antennas correlation comprises:

performing the frequency offset compensation for each antenna respectively according to the calculated frequency offset estimation value of the target user when the antennas correlation is weak;

performing the unified frequency offset compensation for a plurality of the antennas according to the calculated frequency offset estimation value of the target user when the antennas correlation is strong.

In the step of the frequency offset compensation, performing the frequency offset compensation for each antenna respectively according to the calculated frequency offset estimation value of the target user when the antennas correlation is weak is to implement the compensation by taking the calculated frequency offset estimation value of the target user as the slope and generating a channel estimation phase of data part with a linear interpolation.

In order to solve the above problems, the present invention further provides an apparatus for estimating and correcting a frequency offset, located in a terminal or a base station, performing the frequency offset estimation and compensation for a wireless pilot signal, comprising:

a pilot frequency domain channel estimation module, configured for obtaining channel estimation values corresponding to two pilots according to a local frequency domain pilot code and a frequency domain receiving sequence of the two pilots received from an antenna by a target user and transmitting the channel estimation value to a smoothing module;

the smoothing module, configured for smoothing the pilot frequency domain channel estimation value by sections;

a link quality state detection module, configured for performing the link quality detection for the smoothed pilot frequency domain channel estimation value of the target user, obtaining the link quality state and reporting the link quality state to a control module;

the control module, configured for notifying a frequency offset estimation and compensation module to adopt a history smoothing algorithm or adopt a multi-branch attempt algorithm to perform the frequency offset estimation and frequency offset compensation according to the link quality state;

the frequency offset estimation and compensation module, configured for, as per the indication of the control module, according to the pilot frequency domain channel estimation value of the target user, performing the frequency offset estimation and the frequency offset compensation according to the pilot frequency domain channel estimation value which has been smoothed by the smoothing module by sections as per the history smoothing algorithm or the multi-branch attempt algorithm, and performing the frequency offset compensation for a plurality of antennas respectively according to the frequency offset estimation result;

a data demodulation module, configured for performing the demodulation for the data for which the frequency offset compensation has been performed according to the history smoothing algorithm or the multi-branch attempt algorithm; and a link quality parameter selection module, configured for performing the link quality parameter selection for the demodulated data for which the frequency offset compensation has been performed according to the history smoothing algorithm or the multi-branch attempt algorithm;

the control module, further configured for determining this frequency offset estimation output value for which the frequency offset estimation and compensation has been performed by the history smoothing algorithm or the multi-branch compensation method according to the selection result of the link quality parameter selection module, and outputting the history frequency offset value required by the next frequency offset estimation according to this determined frequency offset estimation output value.

The control module is configured for notifying the frequency offset estimation and compensation module to perform the frequency offset estimation and compensation according to a history frequency offset value and the pilot frequency domain channel estimation value of the target user when the link quality state satisfies the startup threshold condition; and the frequency offset estimation and compensation module is further configured for adopting a history smoothing algorithm to perform the frequency offset estimation and the frequency offset compensation, performing a frequency domain demodulation for the data for which the frequency offset compensation has been performed and outputting one link quality state parameter; or the control module is configured for notifying the frequency offset estimation and compensation module to perform the frequency offset estimation and compensation according to the pilot frequency domain channel estimation value of the target user when the link quality state does not satisfy the startup threshold condition; and the frequency offset estimation and compensation module is further configured for adopting a multi-branch attempt algorithm to perform the frequency offset estimation and the frequency offset compensation, performing the frequency domain demodulation for the data for which the frequency offset compensation has been performed and outputting one link quality state parameter.

The link quality state detection module comprises a link quality state register and a link quality state counter, the link quality state register is configured for storing the link quality state; and the link quality state counter is configured for accumulating the number of the link quality states which satisfy the conditions.

The control module is further configured for notifying the link quality state module to update the state in the link quality register and the digit of the link quality state counter after determining this final frequency offset estimation output value.

The method and apparatus for estimating and correcting a frequency offset described in the present invention can be adopted to effectively estimate the relative frequency offset between the base station and the terminal, to reduce the interference introduced by the destruction to the orthogonality of the sub-carriers in OFDM system, and to improve the range of frequency offset estimation and compensation by the receiver. Due to using the history frequency offset method, thus the capability scope of the base station and the terminal performing the frequency offset estimation and compensation has been improved greatly. The technical scheme enables the receiver to perform the frequency offset correction accurately and stably. Especially, when a great frequency offset exists in the high speed moving environment link, it provides the reliable guarantee for the communication service quality. Since the number of the multi-branch attempts is not too much and the calculation amount is not too large, it is a good method for the engineering implementation. The scheme can be applied to the base station and the cell phone, but limited to these. In the case that the hardware capability of the receiver is available, the scope of the frequency offset correction can be enlarged by increasing the number of the branches.

PREFERRED EMBODIMENTS OF THE PRESENT INVENTION

In order to make the objective, the technical scheme and the advantage of the present invention more clearly, the present invention is described in detail with reference to the accompanying drawings hereinafter.

The core inventive point of the present invention lies in: using a link channel state as the reference standard, adopting a multi-branch attempt algorithm to perform a frequency offset estimation and compensation and train a history frequency offset value for a history smoothing algorithm before the link channel state reaches a set threshold, while adopting the history smoothing algorithm to perform the frequency offset estimation and compensation if the link channel state reaches the set threshold; finally determining this frequency offset estimation value according to the link quality state of demodulated data after performing the compensation, updating the link quality state parameter and outputting the history frequency offset value required by next estimation. Through combining the multi-branch attempt algorithm and the history smoothing algorithm, the required history frequency offset value can be and obtained by training quickly, which has an advantage of less calculation quantity. Meanwhile, due to the adopting of the history frequency offset value, it enables that the frequency offset compensation can be performed based on the history frequency offset value after obtaining this remnant frequency offset value by the calculation, which enlarges the accommodation and improves the compensation speed.

Figure 1:
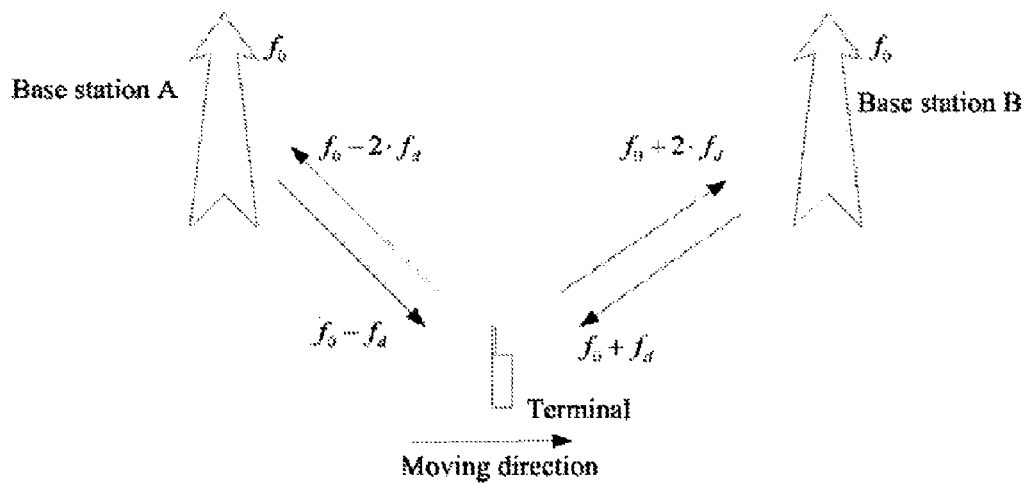
FIG. 1 is a schematic diagram of a frequency offset in a terminal moving process.
Figure 2:
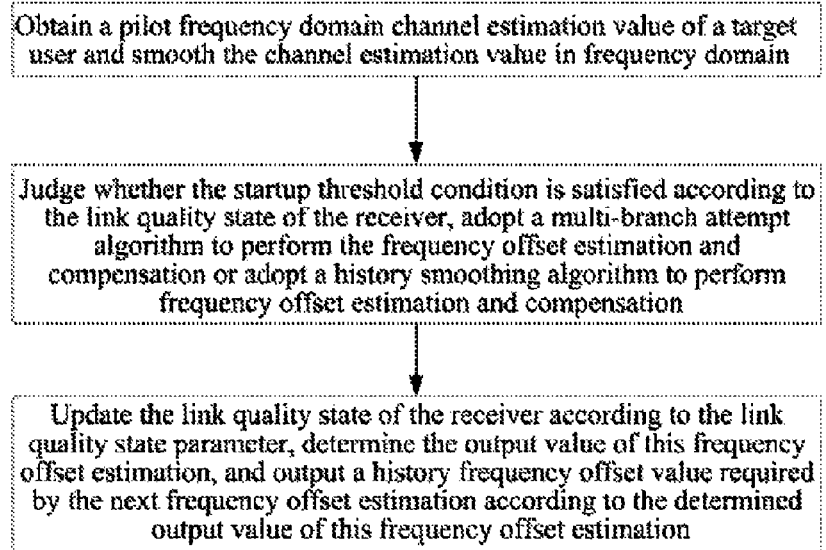
FIG. 2 is a flow diagram of a method for estimating and correcting a frequency offset described by the present invention.

Based on the above thought, the technical scheme of the method for estimating and correcting the frequency offset in the orthogonal frequency division multiplexing system of the present invention is generated. As shown in FIG. 2, it includes the following steps:

A. obtaining a pilot frequency domain channel estimation value of a target user, and smoothing the channel estimation value in frequency domain;

B. obtaining a link quality state of a receiver: adopting a history smoothing algorithm to perform frequency offset estimation and compensation, and performing a frequency domain demodulation for the data for which the frequency offset compensation has been performed and outputting one link quality state parameter, according to a history frequency offset value and the pilot frequency domain channel estimation value of the target user when the link quality state satisfies the startup threshold condition; and adopting a multi-branch attempt algorithm to perform frequency offset estimation and compensation, and performing the frequency domain demodulation for the data for which the frequency offset compensation has been performed and outputting one link quality state parameter, according to the pilot frequency domain channel estimation value of the target user when the link quality state does not satisfy the startup threshold condition;

C. updating the link quality state of the receiver according to the link quality state parameter, determining the output value of this frequency offset estimation, and outputting a history frequency offset value required by the next frequency offset estimation according to the determined output value of this frequency offset estimation.

Figure 3:
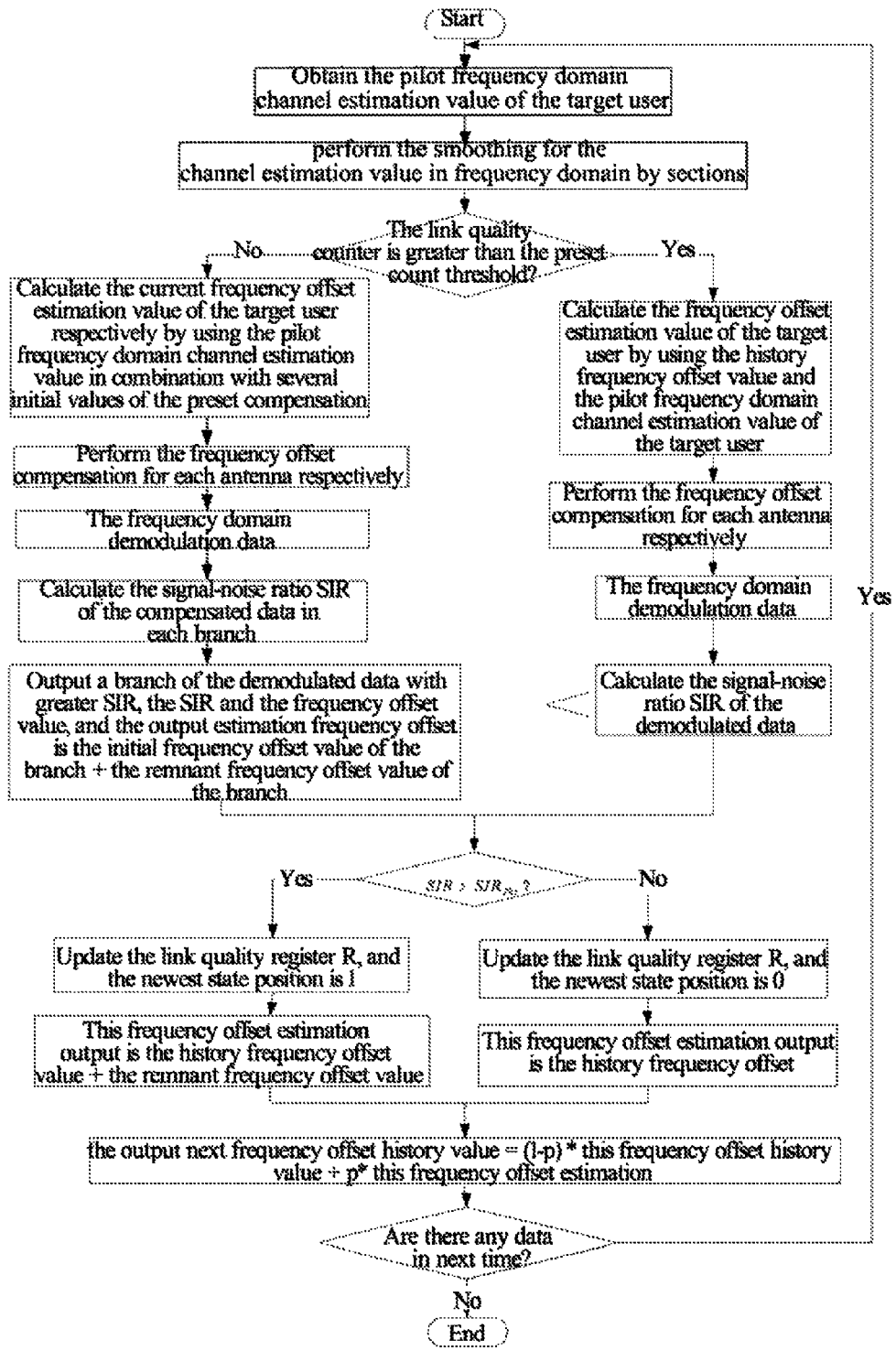
FIG. 3 is a flow diagram of a method for estimating and correcting a frequency offset according to an embodiment of the present invention.

As shown in FIG. 3, a detailed flow diagram of a method for estimating and correcting a frequency offset in the orthogonal frequency division multiplexing system of the present invention is provided, including the following steps:

step 1, obtaining a pilot frequency domain channel estimation value of a target user;

step 2, smoothing the channel estimation value by sections in the frequency domain;

step 3, judging whether to enter into a branch procedure of the history smoothing algorithm to perform the frequency offset estimation or enter into a branch procedure of the multi-branch attempt algorithm to perform the frequency offset estimation:

if yes, then jumping to step 4, to perform the history smoothing frequency offset calculation to estimate and compensate the frequency offset;

if not, then jumping to step 5, to perform the multi-branch frequency offset estimation and compensation, which is used to calculate an initial value of the history smoothing frequency offset calculation and compensate the data frequency offset;

wherein, the link quality state includes a link quality state register R and a link quality counter Count. A bit in the register R is 0 or 1, representing that the link state is good or bad; while the counter Count represents the number of 1s in the register R. The Count is judged for whether it is greater than the preset count threshold, thereby determining whether to start the history smoothing algorithm.

step 4, performing the frequency offset estimation and compensation by using the history smoothing frequency offset calculation; and this step can include the following sub-steps:

4.1 . . . performing the calculation of the frequency offset estimation of the target user by using the history frequency offset value and the pilot frequency domain channel estimation value of the target user;

4.2 . . . performing the frequency offset compensation for each antenna respectively when the relevance of the antennas is weak; otherwise, performing a unified frequency offset compensation for a plurality of the antennas;

4.3 . . . demodulating the data in the frequency domain;

4.4 . . . calculating the signal-noise ratio SIR or CRC check word of the demodulated data;

The degree of the above the antenna correlation is obtained according to the physical type of the antennas.

step 5, adopting the multi-branch attempt algorithm, setting the initial value of the compensation, performing the multi-branch frequency offset estimation and compensation, and calculating the initial value of the history smoothing frequency offset calculation; and this step can include the following sub-steps:

5.1 . . . calculating the frequency offset estimation value of the target user;

5.2 . . . performing the frequency offset compensation for each antenna when the antenna correlation is weak; otherwise, performing a unified frequency offset compensation for a plurality of the antennas;

5.3 . . . demodulating the data in the frequency domain;

5.4 . . . calculating the signal-noise ratio SIR or CRC check word of the demodulated data;

5.5 . . . outputting a branch of demodulated data with 1a greater SIR (or correct CRC) and its corresponding SIR and the frequency offset value, determining that the outputting estimation frequency offset is the initial frequency offset value of the branch+the remnant frequency offset value of the branch;

step 6, judging whether the estimated signal-noise ratio SIR from step 4 or step 5 is greater than the signal-noise ratio threshold $SIR_{Thr}$; if yes, then jumping to step 7; if not, then jumping to step 8;

step 7, updating the link quality register R, in which the latest state position is 1 and the output of this frequency offset estimation is the history frequency offset estimation value+ the remnant frequency offset value; and performing step 9;

step 8, updating the link quality register R, in which the latest state position is 0 and the output of this frequency offset estimation is the history frequency offset estimation value; and performing step 9;

step 9, outputting the history frequency offset value required by the next frequency offset estimation.

The next history frequency offset value=(1-p)*this frequency offset history value+p*this frequency offset estimation.

step 10, updating the link quality counter Count. If there is still data any further next time, then returning to step 1; or else, ending.

The embodiments using the history smoothing algorithm and the multi-branch attempt algorithm to perform the frequency offset estimation and correction are illustrated by the following two embodiments respectively. The following technical scheme description is aimed at the user m, and all the user frequency offset estimation and compensation schemes are identical. Wherein, n represents the number of the data unit for performing the frequency offset calculation.

Firstly, the pilot frequency domain channel estimation value of the target user is obtained. The frequency domain receiving sequence of the pilot 1 is $Y_1^{(m)}(k)$, while the frequency domain receiving sequence of the pilot 2 is $Y_2^{(m)}(k)$. The local frequency domain pilot code is $X^{(m)}(k)$, and the lengths are all M, so the corresponding channel estimation value is shown as below:

$$H_1^{(m)}(k) = \frac{Y_1^{(m)}(k)}{X^{(m)}(k)} = a_k e^{j\phi_1}, 1 \le k \le M;$$

$$H_2^{(m)}(k) = \frac{Y_2^{(m)}(k)}{X^{(m)}(k)} = b_k e^{j\phi_2}, 1 \le k \le M;$$

Wherein, $\phi_1$ and $\phi_2$ include channel phase characteristic and frequency offset phase information of a time $t_1$ corresponding to the pilot 1 and a time $t_2$ corresponding to the pilot 2.

The channel estimation value $H_1^{(m)}(k)$ and $H^{(m)}(k)$ of the user m are divided into Q sections, and the frequency domain smoothing is performed in each section. The averaging is performed for the channel estimation values on the continuous $N_{smoothing}$=M/Q sub-carriers, $$\overline{H}_{1,s}^{(m)} = \frac{1}{N_{smoothing}} \sum_{j=1}^{N_{smoothing}} H_1^{(m)}((s-1) \times N_{smoothing} + j),$$

$$1 \leq s \leq Q, 1 \leq j \leq N_{smoothing}$$

$$\overline{H}_{2,s}^{(m)} = \frac{1}{N_{smoothing}} \sum_{j=1}^{N_{smoothing}} H_2^{(m)}((s-1) \times N_{smoothing} + j),$$

$$1 \leq s \leq Q, 1 \leq j \leq N_{smoothing}.$$

Then, whether to enter into the history branch to perform the frequency offset estimation or enter into the attempt branch to perform the frequency offset estimation is judged according to the link quality state. The link quality state register $R^{(m)}$ is initialized, $R_{n-1}^{(m)} = [b_1 b_2 \ldots b_N]$. Wherein, the bit length of $R^{(m)}$ is N and each bit of $R^{(m)}$ represents a link quality state of one receiving, 0 represents the link quality state is not good, while 1 represents the link quality state is good. The link quality counter $Count^{(m)}$=the number of 1s in the register $R^{(m)}$. $R^{(m)}$ is initialized as all 0 and, update and maintenance is performed for it in a left-out-right-in way.

Whether the link quality counter $Count^{(m)}$ is greater than the threshold $Count_{Thr}$ or not is judged. If yes, then the history smoothing frequency offset calculation is performed to estimate and compensate the frequency offset; if not, then the multi-branch frequency offset estimation and compensation is performed to calculate the initial value of the history smoothing frequency offset calculation.

The value of $Count^{Thr}$ is related to the number of the multi-branch attempts, and the setting of the value can be obtained by the wireless field testing. Various fields can be configured with various values.

Embodiment 1

A Branch Procedure Embodiment of a History Smoothing Algorithm

When $Count^{(m)} > Count_{Thr}$, a history smoothing frequency offset estimation calculation is performed to estimate and compensate the data. A history frequency offset value $\overline{\Delta f}_{n-1}$ is used to participate in the calculation of current remnant frequency offset. The initial value $\overline{\Delta f}_{n-1}$ is from a last frequency offset estimation output. If there is no last output (the case occurs when $Count_{Thr}=0$), then the initial value is $\overline{\Delta f}_{k,0}=0$;

This remnant frequency offset $\Delta\Delta f_{ka}$ is calculated from the following formula:

$$\Delta\Delta f_{s,ka} = \frac{\angle(\overline{H}_{2,s,ka}^{(m)}) - \angle(\overline{H}_{1,s,ka}^{(m)}) - 2\pi \cdot L \cdot t \cdot \overline{\Delta f}_{n-1,ka}}{2\pi \cdot L \cdot t} + l \times 2000$$

$$= \frac{\angle(\overline{H}_{2,s,ka}^{(m)}) - \angle(\overline{H}_{1,s,ka}^{(m)})}{2\pi \cdot L \cdot t} - \overline{\Delta f}_{n-1,ka} + l \times 2000, 1 \leq ka \leq Ka$$

$$\Delta\Delta f_{ka} = \frac{1}{Q} \sum_{s=1}^{Q} \Delta\Delta f_{s,ka};$$

Wherein, L is the number of OFDM signals between two pilots, t is the time interval of the OFDM signals between the two pilots, Ka represents the number of the antennas, and ka represents the antenna number.

After obtaining the remnant frequency offset, the frequency offset of this compensation is determined as:

$$\Delta f_{ka} = \overline{\Delta f_{n-1,ka}} + \Delta\Delta f_{ka}$$

n represents a sub-frame number, l is an integer which makes $\Delta\Delta f_{s,ka} \in (-1000, 1000)$, a signal "∠" represents calculating the phase (the argument principal value of a complex number).

A in-group copy is performed for the smoothed channel estimation value, and after obtaining and $\overline{H}_{1,ka}^{(m)}(k)$ and $\overline{H}_{2,ka}^{(m)}(k)$, $1 \leq k \leq M$, the frequency offset compensation is performed for each antenna respectively when the antenna correlation is weak; otherwise, a unified frequency offset compensation is performed for a plurality of the antennas. The antenna with the weak correlation is taken as an example to illustrate as below:

taking $\Delta f_{ka}$ as the slope, the channel estimation phase of the data section is generated by the linear interpolation:

taking $\overline{H}_{1,ka}^{(m)}(k)$ as the center, the phase linear interpolation is performed to obtain the data channel estimation phase value of the slot 0;

taking $\overline{H}_{2,ka}^{(m)}(k)$ as the center, the phase linear interpolation is performed to obtain the data channel estimation phase value of the slot 1;

$$\phi_{data\_slot0,i,ka}(k) = \Delta f_{ka} \times 2\pi \times \frac{1 \times 10^{-3}}{Num\_Symbol} \times (i-3);$$

$$\phi_{data\_slot1,i,ka}(k) = \Delta f_{ka} \times 2\pi \times \frac{1 \times 10^{-3}}{Num\_Symbol} \times (i-3);$$

[Normal CP]: i=0,1,2,4,5,6, 1≤k≤M, Num_Symbol=14
[Extended CP]: i=0,1,2,4,5, 1≤k≤M, Num_Symbol=12
$H_{data\_slot0,i,ka}(k) = \overline{H}H_{1,ka}^{(m)}(k) \times e^{j\phi_{data\_slot0,i,ka}(k)}$,
$H_{data\_slot1,i,ka}(k) = \overline{H}_{2,ka}^{(m)}(k) \times e^{j\phi_{data\_slot1,i,ka}(k)}$ The data demodulation is performed in frequency domain, and meanwhile the multi-antenna combination is finished, such as ZF demodulation $$\hat{d}_{slot0,i}(k) = (H^H_{data\_slot0,i}(k) H_{data\_slot0,i}(k))^{-1} H^H_{data\_slot0,i}(k) R_{data\_slot0,i}(k)$$

$$\hat{d}_{slot1,i}(k) = (H^H_{data\_slot1,i}(k) H_{data\_slot1,i}(k))^{-1} H^H_{data\_slot1,i}(k) R_{data\_slot1,i}(k)$$

$$H_{data\_slot0,i}(k) = \begin{bmatrix} H_{data\_slot0,i,1}(k) \\ H_{data\_slot0,i,2}(k) \\ M \\ H_{data\_slot0,i,Ka}(k) \end{bmatrix},$$

$$H_{data\_slot1,i}(k) = \begin{bmatrix} H_{data\_slot1,i,1}(k) \\ H_{data\_slot1,i,2}(k) \\ M \\ H_{data\_slot1,i,Ka}(k) \end{bmatrix},$$

Then, the frequency data is transformed to the time domain by using the inverse fast fourier transform (IFFT), $$\hat{d}_{slot0,i}(k) \xrightarrow{ifft} \hat{d}_{slot0,i}(n), \hat{d}_{slot1,i}(k) \xrightarrow{ifft} \hat{d}_{slot1,i}(n)$$

The signal-noise ratio SIR estimation is performed for the data $\hat{d}_{slot0,i}(n)$ and $\hat{d}_{slot1,i}(n)$ to calculate $\hat{SIR}^{(m)}$;

Whether the estimated data signal-noise ratio $SIR_n$ is greater than the signal-noise ratio threshold $SIR_{Thr}$ or not is judged, and $SIR_{Thr}$ can be obtained by simulation or the wireless field testing.

If yes, the link quality register $R_k$ will be updated, and the latest state position is 1, $R_{k,n}=[b_2\ b_3\ \ldots\ b_N\ 1]$ this frequency offset estimation outputs $\Delta f_{ka}= \overline{\Delta f_{n-1,ka}}+\Delta\Delta f_{ka}$;

If not, the link quality register $R_k$ will be updated, and the latest state position is 0, $R_{k,n}=[b_2\ b_3\ \ldots\ b_N\ 0]$ this frequency offset estimation outputs $\Delta f_{ka}\Delta=\overline{f_{n-1,ka}}$;

finally, the history frequency offset value required by the next frequency offset estimation is output. The next history frequency offset value is $\overline{\Delta f_{n,ka}}=(1-p)f\overline{\Delta_{n-1,ka}}\ominus p\cdot f\Delta_{ka}$. The line quality counter $Count^{(m)}$ is updated.

Embodiment 2

A Branch Procedure Embodiment of a Multi-Branch Attempt Algorithm

When $Count^{(m)}\leq Count_{Thr}$, a multi-branch frequency offset estimation and compensation is performed to calculate initial value of a history smoothing frequency offset calculation.

In Z branches, the initial frequency offset values $f_g^{(m)}$, $g=1,\ldots,Z$ of various branches is used to participate in the calculation of a current remnant frequency offset. The initial value $f_g^{(m)}$ is a set value, and can be determined by a simulation. The value of Z can be set according to the capability of a receiver;

This remnant frequency offset $\Delta\Delta f_{ka}$ is:

$$\Delta\Delta f_{s,ka} = \frac{\angle(\overline{H}_{2,s,ka}^{(m)}) - \angle(\overline{H}_{1,s,ka}^{(m)}) - 2\pi\cdot L\cdot t\cdot f_g}{2\pi\cdot L\cdot t} + l\times 2000$$

$$= \frac{\angle(\overline{H}_{2,s,ka}^{(m)}) - \angle(\overline{H}_{1,s,ka}^{(m)})}{2\pi\cdot L\cdot t} - f_g + l\times 2000$$

$$\Delta\Delta f_{ka} = \frac{1}{Q}\sum_{s=1}^{Q}\Delta\Delta f_{s,ka},$$

wherein, L is the number of OFDM signals between two pilots; the frequency offset of this compensation is:

$$\Delta f_{ka,g}=f_g+f\Delta_{ka}^l$$

n represents a sub-frame number, 1 is an integer which makes $\Delta\Delta f_{s,ka}\epsilon(-1000,1000)$, a signal "$\angle$" represents calculating the phase (the argument principal value of a complex number).

A in-group copy is performed to the smoothed channel estimation value, and after obtaining $\overline{H}_{1,ka}^{(m)}(k)$ and $\overline{H}_{2,ka}^{(m)}(k)$, $1\leq k\leq M$, the frequency offset compensation is performed respectively for each antenna when the antenna correlation is weak; otherwise, a unified frequency offset compensation is performed for a plurality of the antennas. The antenna with the weak correlation is taken as an example to illustrate as below:

taking $\Delta f_{ka,g}$, $g=1,\ldots,Z$ as the slope, the channel estimation phase of the data section is generated by the linear interpolation:

taking $\overline{H}_{1,ka}^{(m)}(k)$ as the center, the phase linear interpolation is performed to obtain the data channel estimation phase value of the slot 0;

taking $\overline{H}_{2,ka}^{(m)}(k)$ as the center, the phase linear interpolation is performed to obtain the data channel estimation phase value of the slot 1;

$$\phi_{data\_slot0,i,ka,g}(k) = \Delta f_{ka,g}\times 2\pi\times\frac{1\times 10^{-3}}{\text{Num\_Symbol}}\times(i-3);$$

$$\phi_{data\_slot1,i,ka,g}(k) = \Delta f_{ka,g}\times 2\pi\times\frac{1\times 10^{-3}}{\text{Num\_Symbol}}\times(i-3);$$

[Normal CP]: $i=0,1,2,4,5,6$, $1\leq k\leq M$, Num_Symbol=14
[Extended CP]: $i=0,1,2,4,5$, $1\leq k\leq M$, Num_Symbol=12

$$H_{data\_slot\ 0,i,ka,g}(k) = \overline{H}_{1,ka}^{(m)}(k)\times e^{j\phi_{data\_slot\ 0,i,ka,g}(k)},$$

$$H_{data\_slot\ 1,i,ka,g}(k) = \overline{H}_{2,ka}^{(m)}(k)\times e^{j\phi_{data\_slot\ 1,i,ka,g}(k)},$$

The data demodulation is performed in frequency domain, and meanwhile the multi-antenna combination is finished, such as ZF demodulation $$\hat{d}_{slot0,i,g}(k)=(H_{data\_slot0,i,g}^{H}(k)H_{data\_slot0,i,g}(k))^{-1}H_{data\_slot0,i,g}^{H}(k)R_{data\_slot0,i}(k),$$

$$\hat{D}_{slot1,i,g}(k)=(H_{data\_slot1,i,g}^{H}(k)H_{data\_slot1,i,g}(k))^{-1}H_{data\_slot1,i,g}^{H}(k)R_{data\_slot1,i}(k)$$

Then, the frequency data are transformed to the time domain by using the inverse fast fourier transform (IFFT), $$\hat{d}_{slot0,i,g}(k)\xrightarrow{ifft}\hat{d}_{slot0,i,g}(n),\ \hat{d}_{slot1,i,g}(k)\xrightarrow{ifft}\hat{d}_{slot1,i,g}(n)$$

The branch with a higher signal-noise ratio is selected, or the CRC check word of each module is calculated and the branch with a correct CRC is selected, which is illustrated by taking signal-noise ratio as an example:

The signal-noise ratio SIR estimation is performed for the data $\hat{d}_{slot0,i,g}(n)$ and $\hat{d}_{slot1,i,g}(n)$ to calculate $\hat{SIR}_g^{(m)}$;

The sizes of $\hat{SIR}_g^{(m)}$ are compared, and the largest $\hat{SIR}$ is taken, $dec\_\hat{\ } = \max\{SIR_1, SIR_2, SIR_3\}$ If the largest $\hat{SIR}$—the second largest $\hat{SIR}<SIR_{Thr\_Fre}$, then dec_g=0; or else dec_g=g;

$$dec\_\Delta f_{ka}\Delta=f_{ka,g}$$

$$dec\_\hat{d}_{slot0,i}(n)=\hat{d}_{slot0,i,dec\_g}(n)$$

$$dec\_\hat{d}_{slot1,i}(n)=\hat{d}_{slot1,i,dec\_g}(n)$$

Whether the estimated data signal-noise ratio $SIR_n^{(m)}$ is greater than the signal-noise ratio threshold $SIR_{Thr}$ or not is judged.

If yes, the link quality register $R^{(m)}$ will be updated, and the latest state position is 1, $R_n^{(m)}=[b_2\ b_3\ \ldots\ b_N\ 1]$, this frequency offset estimation outputs $\Delta f_{ka}=\overline{\Delta f_{n-1,ka}}+\Delta\Delta f_{ka}$;

If not, the link quality register $R^{(m)}$ will be updated, and the latest state position is 0, $R_n^{(m)}=[b_2\ b_3\ \ldots\ b_N\ 0]$, this frequency offset estimation outputs $\Delta f_{ka}=\overline{\Delta f_{n-1,ka}}$;

finally, the history frequency offset value required by the next frequency offset estimation is output. The next history frequency offset value is $\overline{\Delta f_{n,ka}} = (1-p)\overline{f\Delta_{n-1,ka}} + p \cdot f\Delta_{ka}$. The link quality counter Count$^{(m)}$ is updated.

The method for frequency estimation and correction of the orthogonal frequency division multiplexing system is provided by the present invention, wherein the frequency offset estimation and correction is performed by using the pilot through the history frequency offset smoothing algorithm and the reliable initial frequency offset correction value is provided for the history smoothing algorithm by using the multi-branch algorithm. By combining the two algorithms, it is to improve the capability scope of the frequency estimation and compensation performed by the base station and the terminal, thereby solving the problem that the receiver performance is limited by the frequency offset correction capability.

Figure 4:
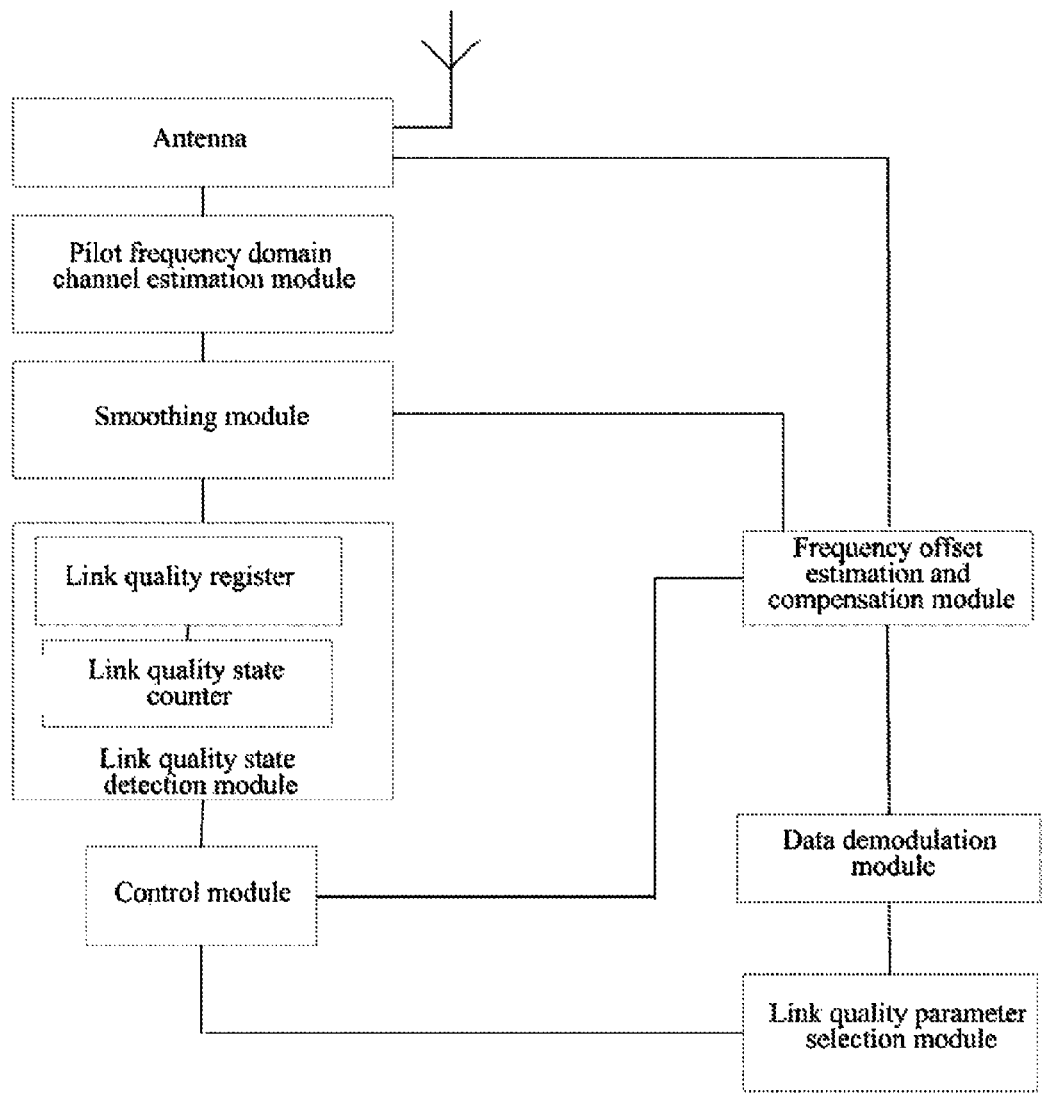
FIG. 4 is a structure diagram of an apparatus for estimating and correcting a frequency offset described by the present invention.

Based on the above frequency offset estimation and correction method, the present invention further provides a frequency estimation and correction apparatus. The apparatus is shown as FIG. 4, including the following modules:

an antenna, used for receiving wireless pilot signal in an OFDM system, and transmitting the wireless pilot signal to a pilot frequency domain channel estimation module;

the pilot frequency domain channel estimation module, used for obtaining a pilot frequency domain channel estimation value corresponding to two pilots according to a local frequency domain pilot code and a frequency domain receiving sequence of the two pilots received by a target user, and transmitting the pilot frequency domain channel estimation value to a smoothing module;

the smoothing module, used for smoothing the pilot frequency domain channel estimation value by sections;

a link quality state detection module, used for performing the link quality detection for the smoothed pilot frequency domain channel estimation value of the target user, obtaining the link quality state and reporting the link quality state to a control module;

the control module, used for notifying a frequency offset estimation and compensation module to adopt a history smoothing algorithm or adopt a multi-branch attempt algorithm to perform the frequency offset estimation and frequency offset compensation:

notifying the frequency offset estimation and compensation module to adopt a history smoothing algorithm to perform frequency offset estimation and compensation, and perform a frequency domain demodulation for the data for which the frequency offset compensation has been performed and output one link quality state parameter, according to a history frequency offset value and the pilot frequency domain channel estimation value of the target user when the link quality state satisfies the startup threshold condition; and notifying the frequency offset estimation and compensation module to adopt a multi-branch attempt algorithm to perform frequency offset estimation and compensation, and perform the frequency domain demodulation for the data for which the frequency offset compensation has been performed and output one link quality state parameter, according to the pilot frequency domain channel estimation value of the target user when the link quality state does not satisfy the startup threshold condition;

the frequency offset estimation and compensation module, used for, as per the indication of the control module, performing the frequency offset estimation and the frequency offset compensation according to the pilot frequency domain channel estimation value of the target user as per the history smoothing algorithm or the multi-branch attempt algorithm, and performing the frequency offset compensation for multiple antennas respectively according to the frequency offset estimation result:

the embodiment of the frequency offset estimation and compensation module performing the frequency offset estimation according to the history smoothing algorithm can be referred to the specific implementation of the embodiment 1;

the embodiment of the frequency offset estimation and compensation module performing the frequency offset estimation according to the multi-branch compensation algorithm can be referred to the specific implementation of the embodiment 2;

a data demodulation module, used for demodulating the data for which the frequency offset compensation has been performed according to the history smoothing algorithm or the multi-branch attempt algorithm;

a link quality parameter selection module, used for performing the link quality parameter selection, such as SIR, for the demodulated data for which the frequency offset compensation has been performed according to the history smoothing algorithm or the multi-branch attempt algorithm;

the control module, used for determining this frequency offset estimation output value for which the frequency offset estimation and compensation has been performed by the history smoothing algorithm or the multi-branch attempt algorithm, and outputting the history frequency offset value required by the next frequency offset estimation according to this determined frequency offset estimation output value.

The link quality state detection module further includes a link quality state register and a link quality state counter. The link quality register is used for storing the link quality state, and the link quality state counter is used for accumulating the number of the link quality states which satisfy the conditions. After determining this final frequency offset estimation output value, the state in the link quality register and the digit of the link quality state counter need to be updated.

The bit in the link quality state register R is 0 or 1, which represents that the link state is good or not good, while the link quality state counter Count represents the number of 1s in the register R. Whether Count is greater than the preset count threshold is judged, thereby determining whether to start the history smoothing algorithm.

The frequency offset estimation and correction apparatus can be a cell phone terminal acting as the receiver or a base station itself, and also can be a specific component in the terminal or the base station.

The present invention is applied to the OFDM system. The above description is only the examples of the present invention and is not intended to limit the present invention. For those skilled in the art, there may be a variety of modifications and variations for the present invention. All of modifications, equivalents and/or variations without departing from the spirit and essence of the present invention should be embodied in the scope of the appending claims of the present invention.

INDUSTRIAL APPLICABILITY

The method and apparatus for estimating and correcting a frequency offset described in the present invention can be adopted to effectively estimate the relative frequency offset between the base station and the terminal, to reduce the interference introduced by the destruction to the orthogonality of the sub-carriers in OFDM system, and to improve the range of frequency offset estimation and compensation by the receiver. Due to using the history frequency offset method, thus the capability scope of the base station and the terminal performing the frequency offset estimation and compensation has been improved greatly. The technical scheme enables the receiver to perform the frequency offset correction accurately and stably. Especially, when a great frequency offset exists in the high speed moving environment link, it provides the reliable guarantee for the communication service quality. Since the number of the multi-branch attempts is not too much and the calculation amount is not too large, it is a good method for the engineering implementation. The scheme can be applied to the base station and the cell phone, but limited to these. In the case that the hardware capability of the receiver is available, the scope of the frequency offset correction can be enlarged by increasing the number of the branches.

What is claimed is:

1. A method for estimating and correcting a frequency offset in an orthogonal frequency division multiplexing system, comprising:

obtaining a pilot frequency domain channel estimation value of a target user and smoothing the channel estimation value in frequency domain;

wherein, the step of obtaining the pilot frequency domain channel estimation value of the target user and smoothing the channel estimation value in frequency domain comprises:

obtaining channel estimation values corresponding to two pilots according to a local frequency domain pilot code and a frequency domain receiving sequence of the two pilots received by the target user; and dividing the channel estimation value corresponding to each pilot of the target user into a plurality of sections, and performing frequency domain smoothing in each section;

obtaining a link quality state of a receiver:

performing frequency offset estimation and frequency offset compensation by a history smoothing algorithm, performing a frequency domain demodulation for the data for which the frequency offset compensation has been performed and outputting one link quality state parameter, according to a history frequency offset value and the pilot frequency domain channel estimation value of the target user when the link quality state satisfies a startup threshold condition, wherein the history frequency offset value is a frequency offset value from a last frequency offset estimation output;

performing the frequency offset estimation and frequency offset compensation by a multi-branch attempt algorithm, performing the frequency domain demodulation for the data for which the frequency offset compensation has been performed and selecting to output one link quality state parameter, according to the pilot frequency domain channel estimation value of the target user when the link quality state does not satisfy the startup threshold condition; and updating the link quality state of the receiver according to the link quality state parameter, determining the output value of this frequency offset estimation, and outputting a history frequency offset value required by next frequency offset estimation according to the determined output value of this frequency offset estimation;

wherein the history smoothing algorithm comprises:

calculating a frequency offset estimation value of the target user by using the history frequency offset value and the pilot frequency domain channel estimation value of the target user; and performing the frequency offset compensation according to the calculated frequency offset estimation value of the target user; and wherein the multi-branch attempt algorithm comprises:

calculating the frequency offset estimation value of the target user by using the pilot frequency domain channel estimation value of the target user and each compensation initial value, and performing the frequency offset compensation according to the calculated frequency offset estimation value of the target user.

2. The method according to claim 1, wherein, the link quality state comprises following parameters:

a signal-noise ratio threshold, which acts as a standard of whether the link quality corresponding to the data for which the frequency offset compensation and demodulation has been performed satisfies a requirement;

a link quality state register R, wherein a state of the R is 0 or 1, and 1 represents that the link state satisfies the requirement and 0 represents that the link state does not satisfy the requirement;

a link quality count threshold, which acts as a startup threshold condition of whether to start the history smoothing algorithm to perform the frequency offset estimation and the frequency offset compensation, wherein, the history smoothing algorithm is stared if greater than the count threshold; and a link quality counter, which is for calculating a number of 1s in the link quality state register, triggering to start the history smoothing algorithm to perform the frequency offset estimation and the frequency offset compensation when a count in the counter is greater than the link quality count threshold; and triggering to start the multi-branch attempt algorithm to perform the frequency offset estimation and the frequency offset compensation when the count in the counter is less than the link quality count threshold.

3. The method according to claim 2, wherein, the step of performing frequency offset estimation and frequency offset compensation by the history smoothing algorithm, performing a frequency domain demodulation for the data for which the frequency offset compensation has been performed and outputting one link quality state parameter, according to the history frequency offset value and the pilot frequency domain channel estimation value of the target user when the link quality state satisfies the startup threshold condition comprises:

performing the frequency offset compensation for an antenna according to the calculated frequency offset estimation value of the target user as per a degree of antenna correlation;

demodulating the data for which the frequency offset compensation has been performed in frequency domain and obtaining frequency domain demodulation data; and calculating a signal-noise ratio (SIR) or a check word (CRC) of the demodulated data, wherein the link quality state parameter is the signal-noise ratio or the check word.

4. The method according to claim 3, wherein, the step of calculating the frequency offset estimation value of the target user by using the history frequency offset value and the pilot frequency domain channel estimation value of the target user comprises:

first, calculating this remnant frequency offset $\Delta\Delta f_{ka}$ according to the pilot frequency domain channel estimation values of the target user $H_1^{(m)}(k)$ and $H_2^{(m)}(k)$ and the history frequency offset value $_\Delta\bar{f}_{n-1}$:

$$\Delta\Delta f_{s,ka} = \frac{L(\overline{H}_{2,s,ka}^{(m)}) - L(\overline{H}_{1,s,ka}^{(m)}) - 2\pi \cdot L \cdot t \cdot \overline{\Delta f}_{n-1,ka}}{2\pi \cdot L \cdot t} + l \times 2000$$

$$= \frac{L(\overline{H}_{2,s,ka}^{(m)}) - L(\overline{H}_{1,s,ka}^{(m)})}{2\pi \cdot L \cdot t} - \overline{\Delta f}_{n-1,ka} + l \times 2000$$

$$\Delta\Delta f_{ka} = \frac{1}{Q}\sum_{s=1}^{Q}\Delta\Delta f_{s,ka},$$

wherein, $_\Delta\bar{f}_{n-1,ka}$ is the history frequency offset value from the last frequency offset estimation output, L is a number of orthogonal frequency division multiplexing signals between two pilots, t is a time interval between the orthogonal frequency division multiplexing signals, n represents a subframe number, l is an integer which makes $\Delta\Delta f_{s,ka} \in (-1000, 1000)$, a signal "∠" represents calculating a phase, and Q represents a number of the sections;

then, determining that this compensation frequency offset is $\Delta f_{ka} = \overline{\Delta f}_{n-1,ka} + \Delta\Delta f_{ka}$.

5. The method according to claim 2, wherein, the step of performing the frequency offset estimation and frequency offset compensation by the multi-branch attempt algorithm, performing the frequency domain demodulation for the data for which the frequency offset compensation has been performed and selecting to output one link quality state parameter, according to the pilot frequency domain channel estimation value of the target user when the link quality state does not satisfy the startup threshold condition comprises:

calculating the frequency offset estimation value of the target user according to the pilot frequency domain channel estimation value of the target user and each compensation initial value;

performing the frequency offset compensation for an antenna according to the calculated frequency offset estimation value of the target user as per the degree of the antenna correlation;

demodulating each of the data for which the frequency offset compensation has been performed in frequency domain and obtaining each of the frequency domain demodulation data;

calculating the signal-noise ratio or the check word of each of the demodulated data, wherein the link quality state parameter is the signal-noise ratio or the check word; and selecting a branch of the demodulated data with a greater signal-noise ratio or a correct check word from each of the demodulated data, taking an initial frequency offset value of the branch+the remnant frequency offset value of the branch as an output estimation frequency offset and taking the signal-noise ratio of the branch as an output signal-noise ratio.

6. The method according to claim 5, wherein, the step of calculating the frequency offset estimation value of the target user according to the pilot frequency domain channel estimation value of the target user and each compensation initial value comprises:

first, calculating this remnant frequency offset $\Delta\Delta f_{ka}$ according to the pilot frequency domain channel estimation values of the target user $H_1^{(m)}(k)$ and $H_2^{(m)}(k)$ and the initial frequency offset values of different branches $f_g^{(m)}$:

$$\Delta\Delta f_{s,ka} = \frac{L(\overline{H}_{2,s,ka}^{(m)}) - L(\overline{H}_{1,s,ka}^{(m)}) - 2\pi \cdot L \cdot t \cdot f_g}{2\pi \cdot L \cdot t} + l \times 2000$$

$$= \frac{L(\overline{H}_{2,s,ka}^{(m)}) - L(\overline{H}_{1,s,ka}^{(m)})}{2\pi \cdot L \cdot t} - f_g + l \times 2000$$

$$\Delta\Delta f_{ka} = \frac{1}{Q}\sum_{s=1}^{Q}\Delta\Delta f_{s,ka},$$

wherein, L is a number of orthogonal frequency division multiplexing signals between the two pilots, l is an integer which makes $\Delta\Delta f_{s,ka} \in (-1000, 1000)$, t is a time interval between the orthogonal frequency division multiplexing signals, a signal "∠" represents calculating a phase, Q represents a number of the sections, g=1, ... Z, wherein Z is a number of the branches;

then, determining that this compensation frequency offset $\Delta f_{ka,g}$ is $\Delta f_{ka,g} = f_g + \Delta\Delta f_{ka}$.

7. The method according to claim 3, wherein, the step of updating the link quality state of the receiver according to the link quality state parameter and determining the output value of this frequency offset estimation comprises:

the link quality state parameter being the signal-noise ratio, determining that the output of this frequency offset estimation is the history frequency offset value+the remnant frequency offset value, meanwhile updating a latest state position as 1 in the link quality register R and updating the count value of the link quality counter if the signal-noise ratio is greater than the signal-noise ratio threshold;

determining the output of this frequency offset estimation is the history frequency offset value, meanwhile updating the latest state position as 0 in the link quality register R if the signal-noise ratio is less than the signal-noise ratio threshold; and determining the history frequency offset value required by the next frequency offset estimation as:

a next history frequency offset value=(1−p)*this history frequency offset value+p*this frequency offset estimation, wherein, p is a decimal between 0 and 1.

8. The method according to claim 3, wherein, the step of performing the frequency offset compensation for the antenna according to the calculated frequency offset estimation value of the target user as per the degree of the antenna correlation comprises:

performing the frequency offset compensation for each antenna respectively according to the calculated frequency offset estimation value of the target user when the antenna correlation is weak;

performing a unified frequency offset compensation to a plurality of the antennas according to the calculated frequency offset estimation value of the target user when the antenna correlation is strong.

9. The method according to claim 8, wherein, in the step of the frequency offset compensation, performing the frequency offset compensation for each antenna respectively according to the calculated frequency offset estimation value of the target user when the antenna correlation is weak is to implement the compensation by taking the calculated frequency offset estimation value of the target user as a slope and generating a channel estimation phase of data part by a linear interpolation.

10. An apparatus for estimating and correcting a frequency offset, located in a terminal or a base station to perform frequency offset estimation and compensation for wireless pilot signals, comprising:
- a pilot frequency domain channel estimation module, configured for obtaining channel estimation values corresponding to two pilots according to a local frequency domain pilot code and a frequency domain receiving sequence of the two pilots received from an antenna by a target user and transmitting the channel estimation values to a smoothing module;
- the smoothing module, configured for dividing a pilot frequency domain channel estimation value into a plurality of sections and smoothing the pilot frequency domain channel estimation value in each section;
- a link quality state detection module, configured for performing a link quality detection for the smoothed pilot frequency domain channel estimation value of the target user, obtaining a link quality state and reporting the link quality state to a control module;
- the control module, configured for notifying a frequency offset estimation and compensation module to perform the frequency offset estimation and frequency offset compensation by a history smoothing algorithm or a multi-branch attempt algorithm according to the link quality state,
  - wherein the history smoothing algorithm comprises:
  - calculating a frequency offset estimation value of the target user by using a history frequency offset value and the pilot frequency domain channel estimation value of the target user, the history frequency offset value being a frequency offset value from a last frequency offset estimation output, and
  - performing the frequency offset compensation according to the calculated frequency offset estimation value of the target user; and
  - wherein the multi-branch attempt algorithm comprises:
  - calculating the frequency offset estimation value of the target user by using the pilot frequency domain channel estimation value of the target user and each compensation initial value, and
  - performing the frequency offset compensation according to the calculated frequency offset estimation value of the target user;
- the frequency offset estimation and compensation module, configured for, as per an indication of the control module, according to the pilot frequency domain channel estimation value of the target user, performing the frequency offset estimation and the frequency offset compensation according to the pilot frequency domain channel estimation value which has been smoothed by the smoothing module as per the history smoothing algorithm or the multi-branch attempt algorithm, and performing the frequency offset compensation for a plurality of antennas respectively according to a frequency offset estimation result:
- a data demodulation module, configured for demodulating the data for which the frequency offset compensation has been performed by the history smoothing algorithm or the multi-branch attempt algorithm; and
- a link quality parameter selection module, configured for performing a link quality parameter selection for the demodulated data for which the frequency offset compensation has been performed by the history smoothing algorithm or the multi-branch attempt algorithm;
- wherein the control module is further configured for determining this frequency offset estimation output value for which the frequency offset estimation and compensation has been performed by the history smoothing algorithm or the multi-branch attempt algorithm according to a selection result of the link quality parameter selection module, and outputting a history frequency offset value required by next frequency offset estimation according to this determined frequency offset estimation output value.

11. The apparatus according to claim 10, wherein,
the control module is configured for notifying the frequency offset estimation and compensation module to perform the frequency offset estimation and compensation according to the history frequency offset value and the pilot frequency domain channel estimation value of the target user when the link quality state satisfies a startup threshold condition; and
the frequency offset estimation and compensation module is further configured for performing the frequency offset estimation and the frequency offset compensation by the history smoothing algorithm, performing a frequency domain demodulation for the data for which the frequency offset compensation has been performed and outputting one link quality state parameter; or
the control module is configured for notifying the frequency offset estimation and compensation module to perform the frequency offset estimation and compensation according to the pilot frequency domain channel estimation value of the target user when the link quality state does not satisfy the startup threshold condition; and
the frequency offset estimation and compensation module is further configured for performing the frequency offset estimation and the frequency offset compensation by the multi-branch attempt algorithm, performing the frequency domain demodulation for the data for which the frequency offset compensation has been performed and outputting one link quality state parameter.

12. The apparatus according to claim 10, wherein,
the link quality state detection module comprises a link quality state register and a link quality state counter,
the link quality state register is configured for storing the link quality state; and
the link quality state counter is configured for accumulating a number of the link quality states which satisfy the condition.

13. The apparatus according to claim 12, wherein,
the control module is further configured for notifying the link quality state module to update the state in the link quality register and digits in the link quality state counter after determining this final frequency offset estimation output value.

14. The method according to claim 5, wherein, the step of updating the link quality state of the receiver according to the link quality state parameter and determining the output value of this frequency offset estimation comprises:
- the link quality state parameter being the signal-noise ratio,
  - determining that the output of this frequency offset estimation is the history frequency offset value+the remnant frequency offset value, meanwhile updating a latest state position as 1 in the link quality register R and updating the count value of the link quality counter if the signal-noise ratio is greater than the signal-noise ratio threshold;
  - determining the output of this frequency offset estimation is the history frequency offset value, meanwhile updating the latest state position as 0 in the link quality register R if the signal-noise ratio is less than the signal-noise ratio threshold; and determining the history frequency offset value required by the next frequency offset estimation as:

a next history frequency offset value=(1−p)*this history frequency offset value+p*this frequency offset estimation, wherein, p is a decimal between 0 and 1.

15. The method according to claim 5, wherein, the step of performing the frequency offset compensation for the antenna according to the calculated frequency offset estimation value of the target user as per the degree of the antenna correlation comprises:

performing the frequency offset compensation for each antenna respectively according to the calculated frequency offset estimation value of the target user when the antenna correlation is weak;

performing a unified frequency offset compensation to a plurality of the antennas according to the calculated frequency offset estimation value of the target user when the antenna correlation is strong.

\* \* \* \* \*